(12) United States Patent
Ding et al.

(10) Patent No.: US 8,705,602 B1
(45) Date of Patent: Apr. 22, 2014

(54) EQUALIZER CIRCUITRY WITH SELECTABLE TAP POSITIONS AND COEFFICIENTS

(75) Inventors: Weiqi Ding, Fremont, CA (US); Mengchi Liu, Fremont, CA (US); Mingde Pan, Morgan Hill, CA (US); Thungoc M. Tran, San Jose, CA (US); Sergey Shumarayev, Los Altos Hills, CA (US)

(73) Assignee: Altera Corporation, San Jose, CA (US)

( * ) Notice: Subject to any disclaimer, the term of this patent is extended or adjusted under 35 U.S.C. 154(b) by 727 days.

(21) Appl. No.: 12/580,587

(22) Filed: Oct. 16, 2009

(51) Int. Cl.
*H03H 7/30* (2006.01)
*H03H 7/40* (2006.01)

(52) U.S. Cl.
USPC ............ 375/229; 375/232; 375/295; 375/328

(58) Field of Classification Search
USPC ......... 375/229–236, 295, 316, 346, 350, 285, 375/284, 240.29, 240.26, 219; 382/260–265
See application file for complete search history.

(56) References Cited

U.S. PATENT DOCUMENTS

| | | | |
|---|---|---|---|
| 2003/0179027 A1* | 9/2003 | Kizer et al. | 327/158 |
| 2004/0264562 A1* | 12/2004 | Wu et al. | 375/233 |
| 2007/0210843 A1* | 9/2007 | Takai | 327/158 |
| 2008/0170027 A1* | 7/2008 | Kyeong et al. | 345/100 |
| 2008/0187037 A1* | 8/2008 | Bulzacchelli et al. | 375/233 |
| 2010/0104212 A1* | 4/2010 | Fujita et al. | 382/263 |

* cited by examiner

*Primary Examiner* — Sam K Ahn
*Assistant Examiner* — Linda Wong
(74) *Attorney, Agent, or Firm* — Ropes & Gray LLP (57) ABSTRACT

Transmitter equalizer circuitry, e.g., for a serial, digital, data signal, includes tapped delay line circuitry for outputting a plurality of differently delayed versions of the signal propagating through the delay line circuitry. The equalizer circuitry also includes a plurality of electrical current digital-to-analog converters ("DACs"). The equalizer circuitry still further includes controllable (e.g., programmable) routing circuitry for selectably routing the delayed versions of the signal to the various DACs. The current strengths employed by the various DACs are also preferably controllable (e.g., programmable).

23 Claims, 8 Drawing Sheets

EQUALIZER CIRCUITRY WITH SELECTABLE TAP POSITIONS AND COEFFICIENTS

BACKGROUND

This invention relates to equalizer circuitry, and more particularly to equalizer circuitry that can be constructed to have selectably different operating characteristics for meeting a variety of different possible needs when the circuitry is put to use.

In general, the terms "equalizer," "equalization," or the like can be applied to either circuitry that transmits a signal (e.g., an electrical signal), or to circuitry that receives a signal. The present invention relates to equalizers in transmitter circuitry, and so it will be understood that all uses of terms like "equalizer" herein refer to circuitry for transmitting a signal or for preparing a signal for transmission. Another term that is sometimes used for equalization of this type (i.e., in transmitter circuitry) is pre-emphasis.

A typical reason for giving a signal that is to be transmitted equalization or pre-emphasis prior to transmitting the signal is to compensate for certain kinds of losses that the signal will experience as it travels through a transmission medium or channel to the circuitry that must receive and correctly interpret it. For example, it may be desirable to give a digital data signal extra (pre-emphasis) energy immediately following each transition in the level of the signal because a transmission channel can particularly degrade the "sharpness" or "crispness" of such transitions in conveying the signal to the receiver circuitry. Anticipating such degradation of transitions by giving them extra energy at the transmitter (i.e., by means of equalization or pre-emphasis) can improve the "quality" of the transitions as seen at the receiver, even after the inevitable degradation produced by the transmission channel. This can help the receiver circuit to more quickly and accurately detect the logical level (and changes or transitions in the logical level) of the received data signal. Such improvements to data reception can make possible the use of higher data transmission speeds without adversely affecting data transmission reliability.

Some devices (i.e., integrated circuit devices) are intended for relatively general purpose use. In other words, the device may be manufactured with the intention that it can be put to any of a variety of different uses. This may mean, for example, that the exact properties of a transmission channel (e.g., from that device to another device on a printed circuit board) that the device may be called upon to drive with an output signal may not be known to the device manufacturer. On the other hand, it is desirable for the manufacturer to be able to provide one device construction that can serve a variety of transmission channel characteristics, because that helps the manufacturer increase production volume of each of a smaller number of different device designs, thereby tending to decrease the unit cost of each device. Preferably, the device is manufactured so that each user can easily customize it to meet that user's particular needs (in this case, with respect to the operating characteristics of equalizer circuitry on the device).

Examples of the types of customizable devices that are referred to above are programmable logic devices ("PLDs"), field-programmable gate arrays ("FPGA"), programmable micro-controllers, and the like.

Heretofore, some devices of the types referred to above have included pre-emphasis or equalizer circuitry having some user-selectable operating characteristics. However, these user-selectable aspects have been only of limited kinds.

SUMMARY

In accordance with certain possible aspects of the invention, transmitter equalizer circuitry for operating on an input signal to produce an equalized signal may include delay line circuitry for producing a plurality of differently delayed versions of the input signal. The equalizer circuitry may further include a plurality of electrical current digital-to-analog converter ("DAC") circuits. The equalizer circuitry may still further include routing circuitry for selectably routing each of the delayed versions of the input signal to at least a respective subplurality of the DAC circuits.

Further features of the invention, its nature and various advantages will be more apparent from the accompanying drawings and the following detailed description.

DETAILED DESCRIPTION

Figure 1:
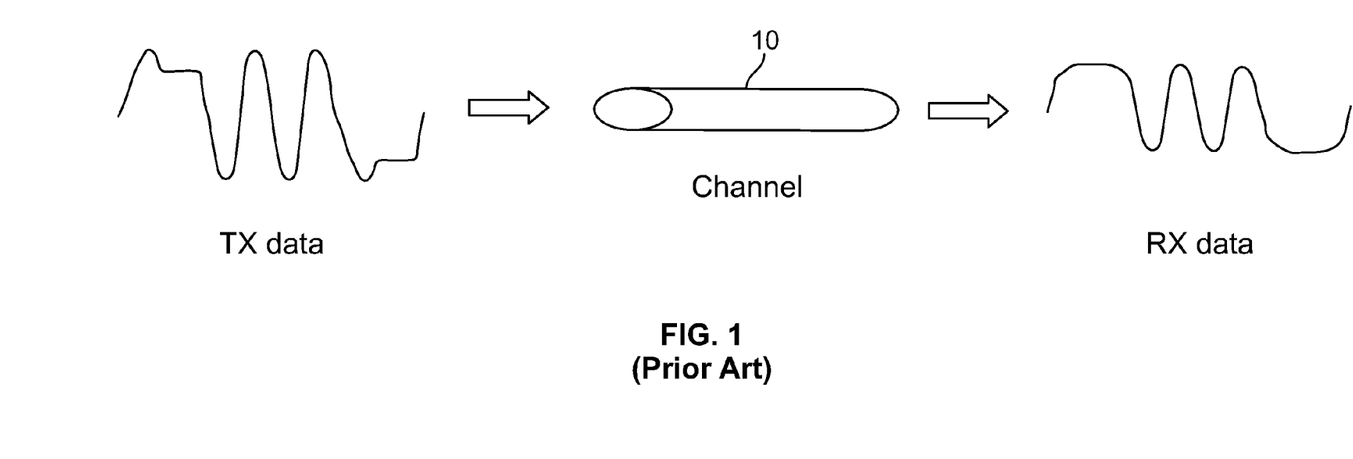
FIG. 1 is a simplified schematic diagram illustrating typical operating characteristics of known signal communication or transmission channels.

By way of further background, FIG. 1 shows an illustrative serial, digital, data signal ("TX data") that has been given pre-emphasis prior to being transmitted via transmission channel 10. (In general, "TX" denotes transmitter, and "RX" denotes receiver.) For example, it can be seen that TX data has been given extra energy (signal strength or amplitude) after each transition in the level of that signal. After transmission via channel 10, the received version of this signal ("RX data") may have a signal trace like that shown on the right in FIG. 1. Although channel 10 may have attenuated most or all of the pre-emphasis shown in TX data, RX data is nevertheless a better-quality signal than it would have been if it had not been given pre-emphasis prior to transmission.

To briefly recapitulate, the purpose of TX equalization is to pre-distort the TX data signal to compensate (in advance) for expected channel loss. Among the typical attributes of such TX equalization are to reduce amplitude of the lower frequency components, while the higher frequency components are peaked relatively. This is often accomplished with a so-called pre-cursor or post-cursor tap, as will be described in more detail in subsequent paragraphs. A more general name that is sometimes used is feed-forward equalization or FFE, and more general cases employ multiple taps. Advantages of FFE include (1) a data signal at RX having more balanced high/low frequency components, (2) less inter-symbol interference ("ISI") effects, and (3) wider eye opening. (If each portion of the RX data signal that represents one data bit is superimposed, in time, on all other such portions of the RX signal, the resulting composite or superimposed signal trace may have an appearance somewhat like an open eye (time is assumed to be the horizontal axis). Steeper (sharper or crisper) transitions at the beginning and ending of each data bit help to make the opening of such an eye wider. This enables the receiver circuitry to recognize a transition sooner and/or to have more time in which to detect that the received data signal has a new level. A wider eye opening therefore has benefits for improved receiver circuit operation.)

Figure 2:
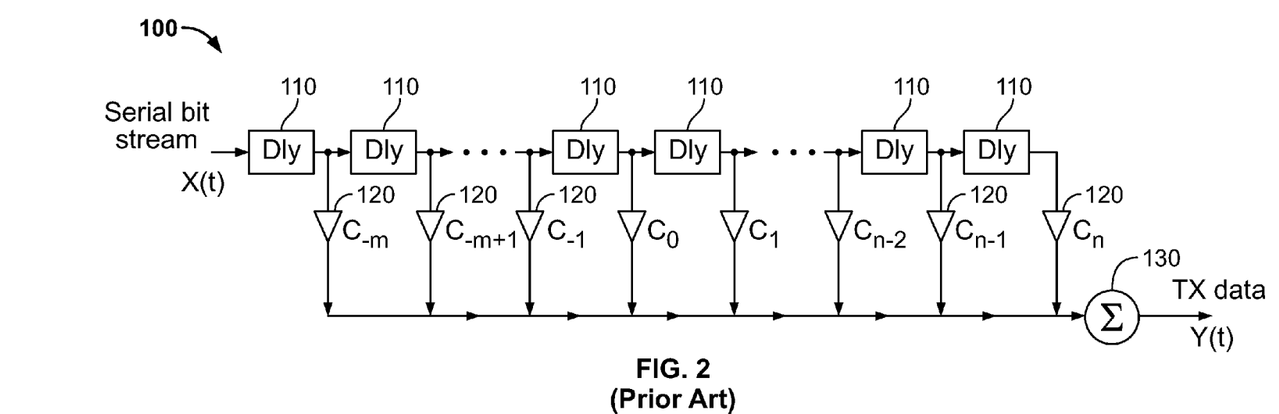
FIG. 2 is a simplified schematic block diagram of illustrative, known, feed-forward equalizer ("FFE") or finite impulse response ("FIR") filter circuitry.

Typical, known circuitry 100 for implementing feed-forward equalization or FFE is shown in FIG. 2. Circuitry 100 is a finite impulse response or FIR filter with multiple taps. Circuitry 100 performs a TX equalization operation on an input serial bit stream signal (also referred to as X(t)). The serial data signal time delay 110 between any two consecutive taps is one unit interval or UI. (A unit interval is the time duration of one bit in the data signal.) At each such tap (i.e., between two consecutive time delay circuit elements 110) the data signal is multiplied (amplified) by a respective one of coefficients c in a respective one of electrical circuit elements 120. For example, each of circuit elements 120 may be an electrical current, digital-to-analog converter ("current DAC"). The electrical current strength of each current DAC 120 is proportional to the FIR filter coefficient c that it is desired for that filter tap to have. The output signals of all of circuit elements 120 are added (summed) by summation electrical circuit element 130 to produce the serial TX data signal (also referred to as Y(t)). For example, circuit element 130 may sum the electrical currents output by all of circuit elements 120.

The z-domain transfer function for circuitry 100 is as follows:

$$H(z) = Y(z)X(z)$$
$$= c_{-m}z^{-m} + \ldots + c_{-1}z^{-1} + c_0 + c_1 z^1 + \ldots + c_n z^n$$

The tap having coefficient $c_0$ is typically referred to as the main tap. The so-called pre-cursor taps have coefficients $c_{-1} \ldots c_{-m}$. The so-called post-cursor taps have coefficients $c_1 \ldots c_n$.

The impulse response of the channel with which circuitry of the type shown in FIG. 2 is to be used for TX FFE determines (1) the number of taps that should be used, (2) the positions of the taps to be used (e.g., how many pre-cursor taps are used and how many post-cursor taps are used), and (3) the tap coefficient values c that should be used. As mentioned above, tap coefficients c are normally implemented using a current DAC for each of elements 120. Note, however, that the total of the coefficient currents (including that from the main tap) is typically limited by the maximum allowable TX signal swing. Note also that increasing the amount of current that an element 120 must provide increases the required size of the switching devices (e.g., transistors) in that element 120 to which the tapped data signal is applied in order to switch the current of that element 120. Such larger switching devices can have a negative impact on TX return loss.

Figure 3:
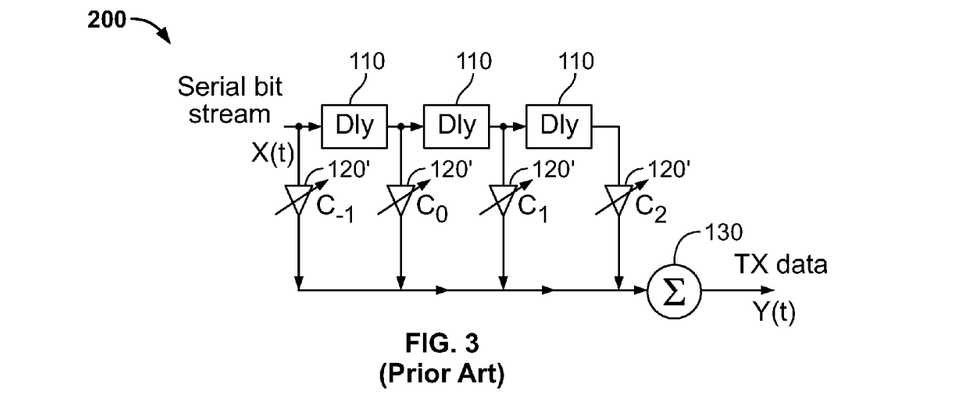
FIG. 3 is a simplified schematic block diagram of other, illustrative, known FFE circuitry.

FIG. 3 shows TX equalizer circuitry 200 (with some selectable operating characteristics) that has been used in known integrated circuits such as PLDs or FPGAs. Circuitry 200 has a fixed number of taps (i.e., four taps (including the main tap)). Circuitry 200 also has fixed tap positions (i.e., the main tap, one pre-cursor tap, and two post-cursor taps). However, circuitry 200 does have selectable (e.g., programmably controllable) tap coefficients (i.e., a main tap coefficient $c_0$ up to 12 mA (milliamps), a pre-cursor tap coefficient $c_{-1}$ up to 2 mA, a first post-cursor tap coefficient $c_1$ up to 5.875 mA, and a second post-cursor tap coefficient $c_2$ up to 2 mA). Each of current DACs 120' is controllably variable (e.g., via programmable control) to provide the desired tap coefficient value within the corresponding range specified in the preceding sentence.

From the foregoing it will be seen that the maximum total coefficient currents in circuitry 200 are greater than the maximum allowable output current (i.e., 12 mA) of that circuitry. This means that the area efficiency of the current DACs 120' in circuitry 200 is not optimal. For example, there is always a significant amount of DAC 120' current capacity or capability that is unused, no matter how the permitted 12 mA maximum output current is sourced from the various DACs 120'.

Figure 4:
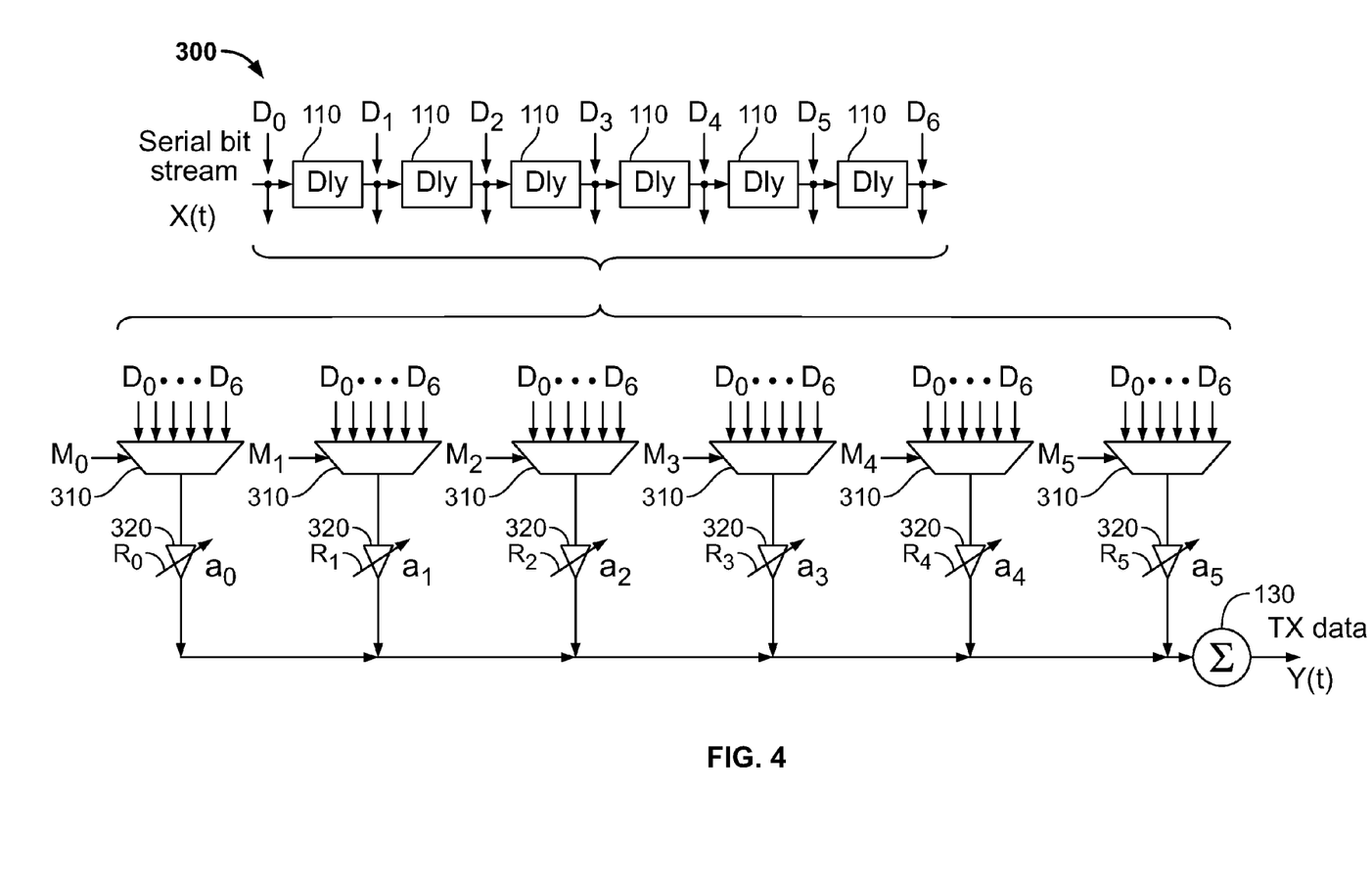
FIG. 4 is a simplified schematic block diagram of an illustrative embodiment of FFE circuitry in accordance with certain possible aspects of this invention.

An illustrative embodiment of more flexible TX FFE circuitry 300 in accordance with this invention is shown in FIG. 4. Circuitry 300 receives the serial bit stream data signal X(t) at input tap $D_0$. This signal is applied to the input terminal of the first of six serially connected delay circuit elements 110, and to one of the seven selectable input terminals of each of six multiplexers ("muxes") 310. Each delay circuit element 110 delays the serial data signal applied to it by one unit interval ("UI") before passing the delayed signal on to the next delay element 110 in the series. Each mux 310 is controllable by the selection control signals M applied to that mux to select one of its selectable inputs $D_0$-$D_6$ to be its output signal. The output signal of each mux 310 is applied to a respective one of controllably variable current DACs 320. The current strength employed by each of DACs 320 is determined (within the available current strength range of that DAC) by current strength control signals R applied to that DAC. The output signals (currents) of all of DACs 320 are summed by circuit element 130 to produce the TX data output signal Y(t) of circuitry 300.

Going back to the chain or series of delay circuit elements 110 (sometimes collectively referred to as delay line 110 or the like), the output signal of the first of those elements is applied to intermediate delay line tap $D_1$. As will be apparent from the earlier discussion, the signal at $D_1$ is the signal at $D_0$ after a delay of one UI. The $D_1$ tap signal is applied to the second delay circuit element 110 in the series of elements 110, and also to a second one of the selectable inputs of each of muxes 310.

The output signal of the second delay circuit element 110 is applied to a second intermediate delay line tap $D_2$. This signal is the $D_1$ signal delayed by one UI. The $D_2$ signal is applied to the third delay circuit element 110 in the series, and also to a third one of the selectable inputs of each of muxes 310.

The progression through elements 110 being described continues, so that increasingly further delayed versions of input signal X(t) are produced at successive further delay line taps $D_3$, $D_4$, $D_5$, and $D_6$. Each of these further tap signals $D_3$-$D_6$ is applied to respective further selectable inputs of muxes 310. Thus each mux 310 can be controlled (by its selection control input signals M) to select any one of delay line 110 tap signals $D_0$-$D_6$ as the output signal of that mux. The input-to-output selection made by each mux 310 can be different from the selections made by all of the other muxes, or it can be the same as the selection made by one or more other muxes. In other words, the selection control signals $M_0$-$M_5$ of each mux are preferably independent of one another, although two or more of these selection control signal groups M can have the same value if desired.

As in the case of mux selection control signals M, current strength control signals $R_0$-$R_5$ for each of current DACs 320 are also preferably independent of one another. This makes it possible to independently control the current strength of each of DACs 310. The current strengths employed by each DAC 310 can be controlled (by signals R) to be different from the current strengths employed by all of the other DACs, or two or more DACs 310 can be controlled (by their control signals R) to employ the same current strength.

Control signals M and R can come from any suitable source. For example, if the device that includes circuitry 300 is a programmable device like a PLD, FPGA, programmable microcontroller, or the like, signals M and/or R can come from programmable memory (e.g., device configuration control memory) of the device. Alternatively, more dynamic random access memory ("RAM") circuitry on the device can be used to store and output desired values for signals M and for R. As still another example, even more dynamic control circuitry (e.g., logic circuitry) on the device that includes circuitry 300 can be used to provide signals M and/or R. Or signals M and/or R can come from a source or sources external to the device that includes circuitry 300.

For purposes of further discussion, the current strength employed by each of current DACs 320 is denoted by the "a" reference next to that DAC in FIG. 4. Thus the current strength employed by the left-most DAC 320 is $a_0$, and the current strength employed by the right-most DAC 320 is $A_5$. The value of each parameter "a" in any particular use of circuitry 300 is a function of (1) the maximum current strength that the associated DAC 320 is constructed to make available for possible use, and (2) the value of the control signals R applied to that current source. For example, the left-most DAC 320 may be constructed to make available a maximum current of 1 mA. Control signals $R_0$ can then control that DAC to actually employ (i.e., have as an actual maximum output current $a_0$) any value of current in the range from 0 to 1 mA. As another example, the DAC controlled by signals $R_2$ may be constructed to have a maximum available output current of 3 mA. Control signals $R_2$ can then control that DAC to actually employ (i.e., have as an actual maximum output current $a_2$) any current value in the range from 0 to 3 mA.

In an illustrative construction of circuitry 300, the total of the currents output by all of DACs 320 is less than or equal to 12 mA. (This "total" current is, of course, the current output by circuit element 130.) For this purpose, DACs 320 are constructed (in this illustrative embodiment) so that the maximum current available from the DACs controlled by signals $R_2$ and $R_3$ in 3 mA, the maximum current available from the DACs controlled by signals $R_1$ and $R_4$ is 2 mA, and the maximum current available from the DACs controlled by signals $R_0$ and $R_5$ is 1 MA. This means that each of $a_2$ and $a_3$ is less than or equal to 3 mA, each of $a_1$ and $a_4$ is less than or equal to 2 mA, and each of $a_0$ and $a_5$ is less than or equal to 1 mA. If all of DACs 320 are operated at their full available current strength, it will be seen that their maximum total output current is 12 mA.

FIG. 4 and the above discussion make it clear that in circuitry 300 the signal at any of delay line taps $D_0$-$D_6$ can be selected by any one or more of muxes 310 for application to any one or more of current DACs 320, and that each of DACs 320 can be controlled to employ any current strength (the value of the associated parameter "a") up to the maximum available current strength of that DAC. This makes circuitry 300 completely flexible with regard to (1) how many taps are employed in a TX FFE function, (2) how the taps that are used are distributed on each side of the main tap (i.e., how many pre-cursor taps are used and how many post-cursor taps are used), and (3) the value of the coefficient c applied to the signal being processed in each tap. As just one example of this tap position flexibility, if delay line tap $D_2$ is chosen as the main tap, delay line taps $D_0$ and $D_1$ can be pre-cursor taps, and delay line taps $D_3$-$D_6$ can be post-cursor taps.

Figure 9:
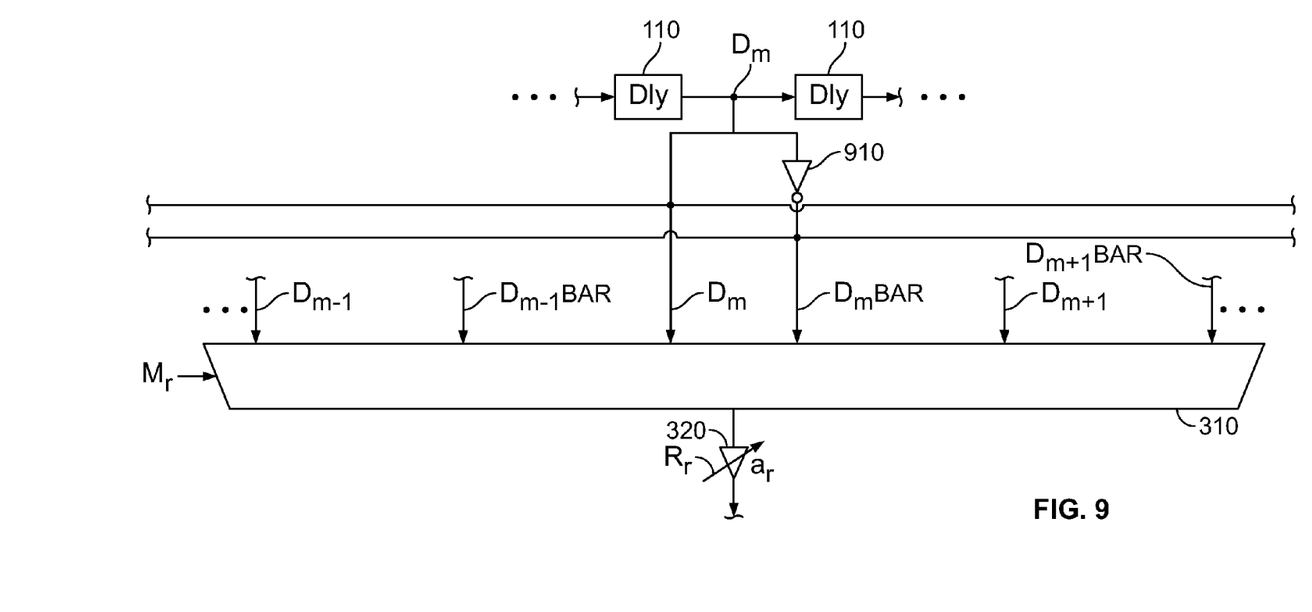
FIG. 9 is a simplified schematic block diagram of an illustrative embodiment of a possible modification of a representative portion of circuitry in accordance with the invention.

The illustrative construction of circuitry 300 that is shown in FIG. 4 has a maximum of six TX FFE taps, but it will be understood that circuitry of this type can be constructed to support a different maximum number of taps if desired. For example, if the number of delay line taps D or the number of circuit structure 310/320 is less than shown in FIG. 4, then the maximum number of TX FFE taps will be correspondingly less than six. On the other hand, if the number of delay line taps D and the number of circuit structures 310/320 is more than shown in FIG. 4, then the maximum number of TX FFE taps will be correspondingly more than six. As another example of possible modifications, the number of circuit structures 310/320 can be increased (even without increasing the number of delay line taps D) to make possible even more tap "splitting" (i.e., passage of a signal from one of delay line taps D through two or more of structures 310/320). As still another example of possible modifications, the (algebraic) sign of each tap coefficient can be positive or negative. An illustrative way of accomplishing this is shown in FIG. 9 and described later in this specification.

Figure 5:
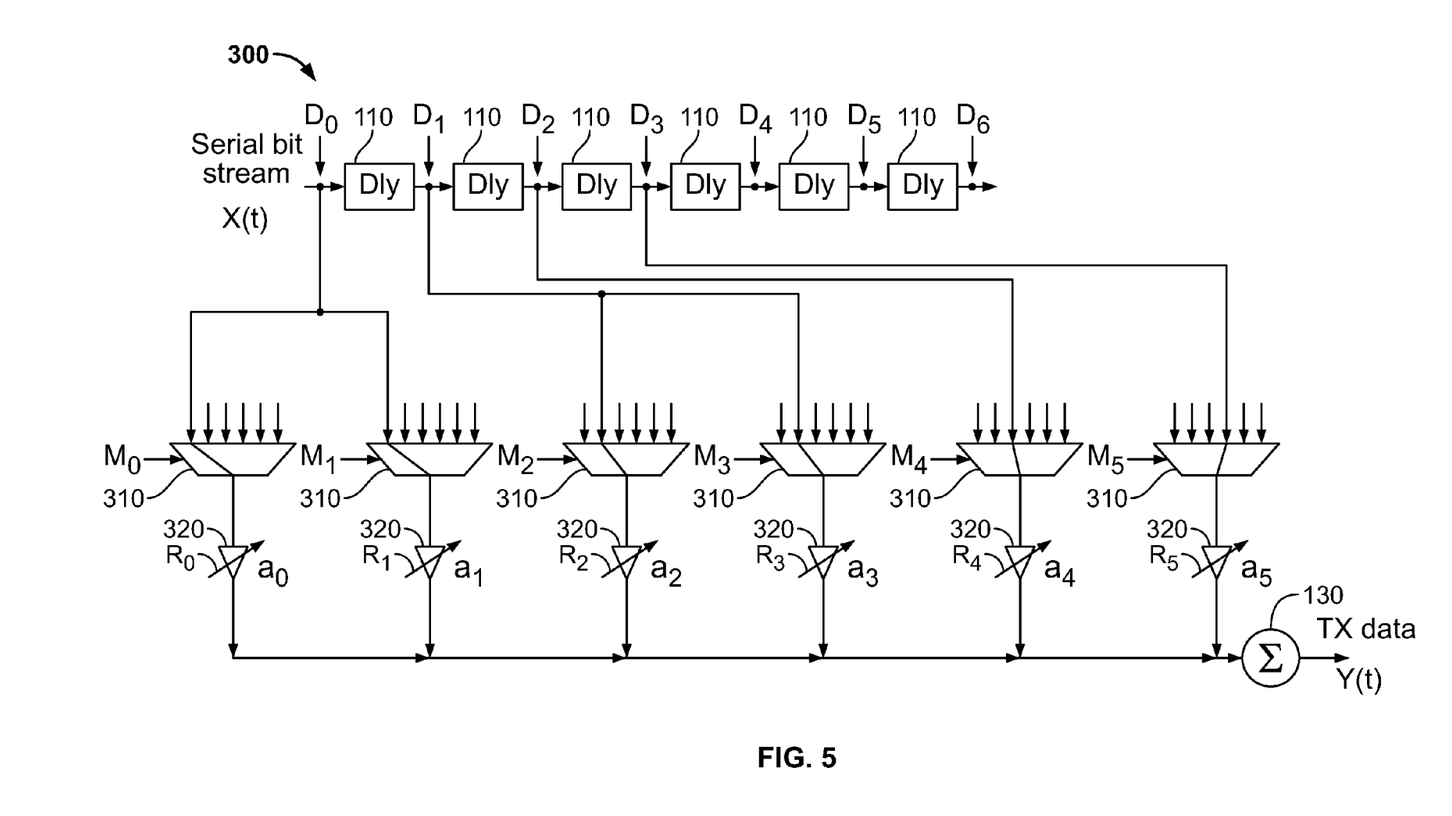
FIG. 5 is similar to FIG. 4, but shows one example of how the FIG. 4 circuitry may be configured by a user to perform a particular FFE function.

FIG. 5 shows an illustrative example of how circuitry constructed as shown in FIG. 4 may be controlled (e.g., configured or programmed) by a user to achieve a particular TX FFE function. In FIG. 5 all of the routing connections from delay line 110 to and through muxes 310 that are actually used are drawn in completely. The FIG. 5 configuration has a main tap, one pre-cursor tap, and two post-cursor taps. The z-domain transfer function of the FIG. 5 configuration is:

$$H(z) = Y(z)X(z)$$
$$= (a_0 + a_1)z^{-1} + (a_2 + a_3) + a_4 z + a_5 z^2$$

From FIG. 5 (and the immediately above equation) it will be seen that the pre-cursor tap (sourced from delay line tap $D_0$) and the main tap (sourced from delay line tap $D_1$) are both split taps. This means that each of these source signals passes through two circuit structures 310/320 in order to be given some current from each of two DACs 320. For example, some of the pre-cursor tap current is supplied by each of the DAC controlled by $R_0$, and the remainder of the pre-cursor tap current is supplied by the DAC controlled by $R_1$. In the case of the main tap, some of the current is supplied by each of the DACs controlled by $R_2$ and $R_3$. The two post-cursor taps (sourced from delay line taps $D_2$ and $D_3$) are not split taps. Each of these taps gets all of its current from just one DAC 320.

Figure 6:
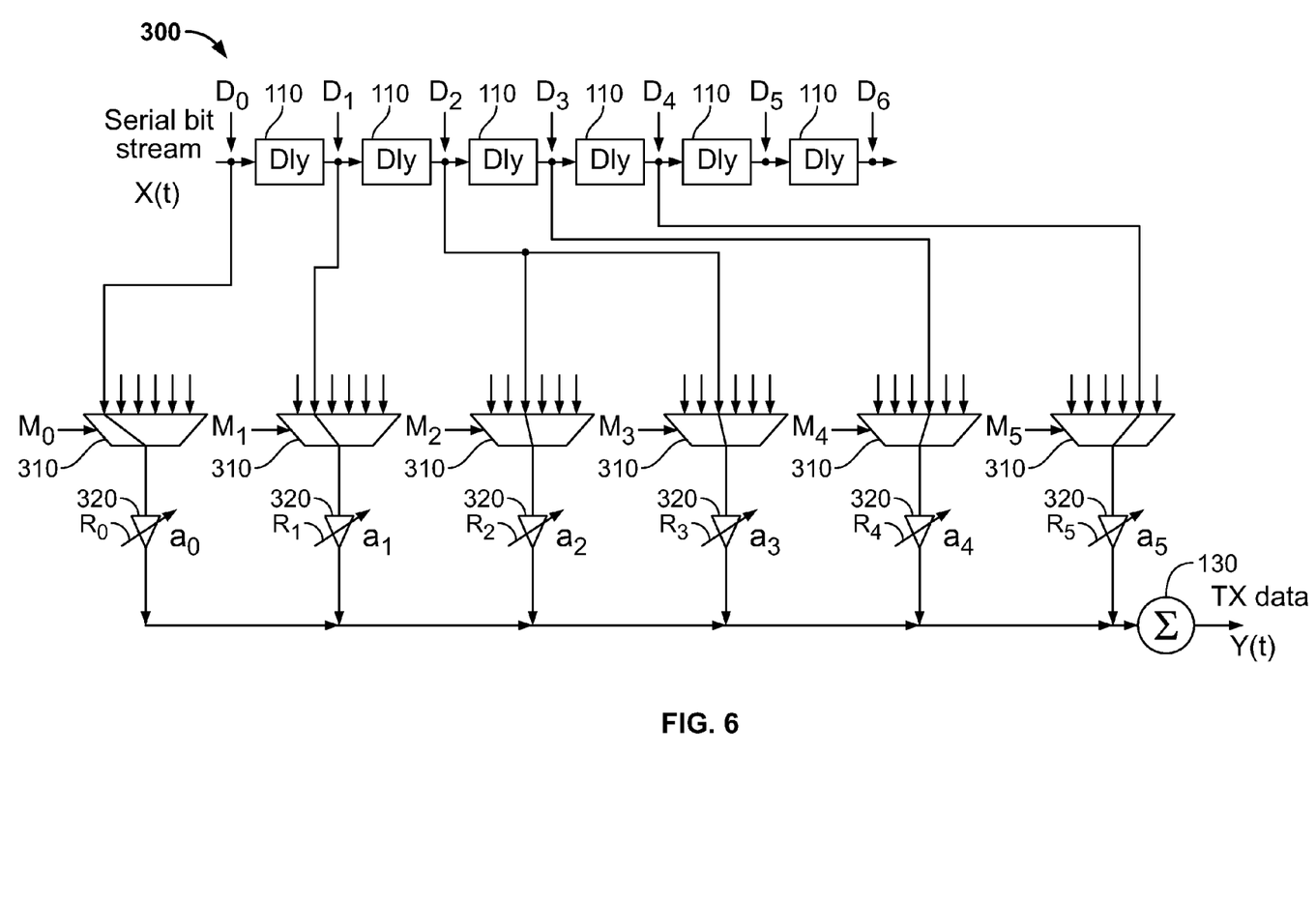
FIG. 6 is again similar to FIG. 4, but shows another example of how the FIG. 4 circuitry may be configured by a user to perform a different FFE function.

FIG. 6 shows another illustrative example of how circuitry constructed as shown in FIG. 4 may be controlled (e.g., configured or programmed) by a user to achieve another illustrative TX FFE function. Again in FIG. 6 all of the routing connections that are actually used from delay line 110 to and through muxes 310 are completely drawn in. The FIG. 6 configuration has a main tap (sourced from delay line tap $D_2$), two pre-cursor taps (sourced from delay line taps $D_0$ and $D_1$), and two post-cursor taps (sourced from delay line taps $D_3$ and $D_4$). The z-domain transfer function of the FIG. 6 configuration is:

$$H(z) = X(z)Y(z)$$
$$= a_0 z^{-2} + a_1 z^{-1} + (a_2 + a_3) + a_4 z + a_5 z^2$$

In FIG. 6 only the main tap is a so-called split tap (which means that the main tap gets some of its current from each of the DACs controlled by $R_2$ and $R_3$.) All of the other taps are not split taps (which means that each of these other taps gets all of its current from a respective one of the other DACs 320).

Figure 7:
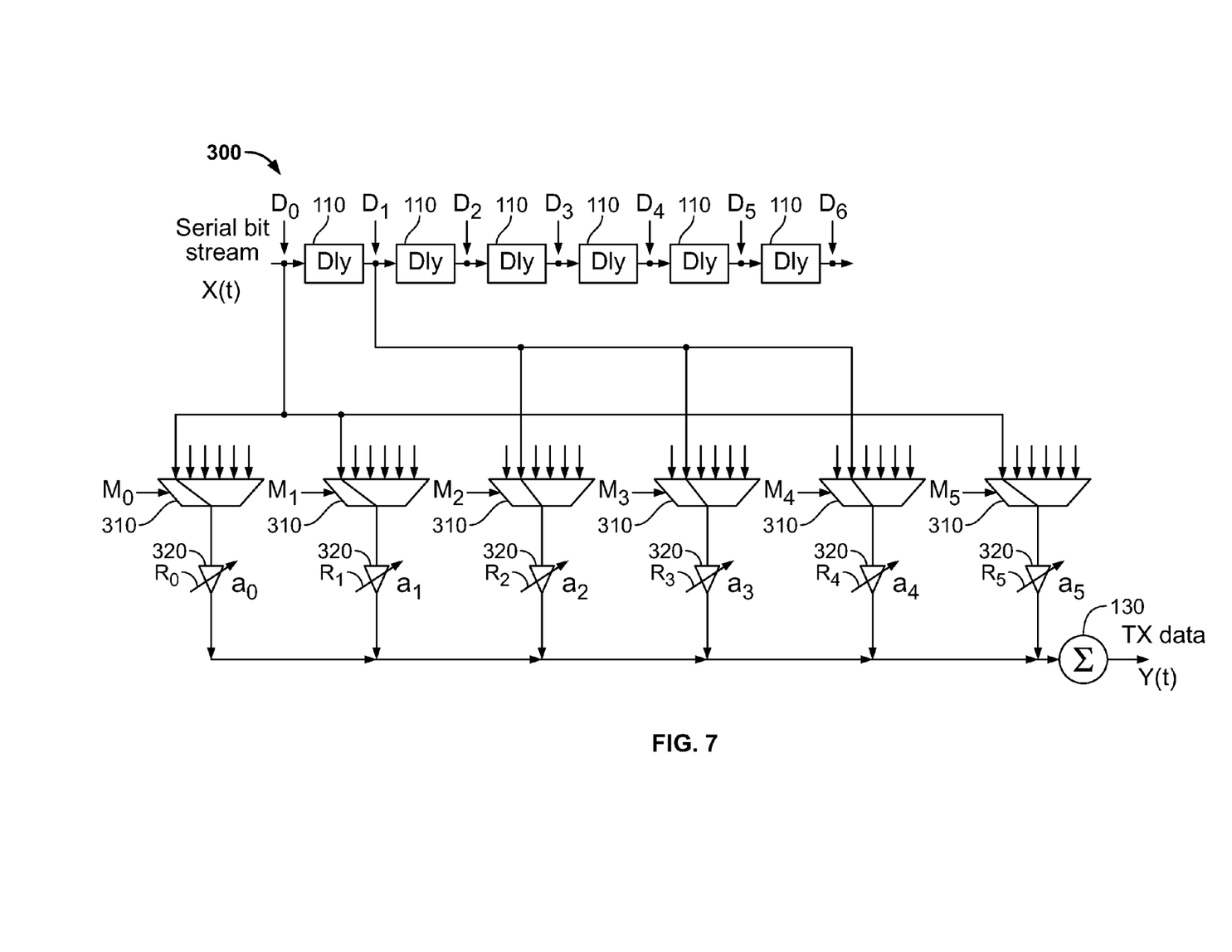
FIG. 7 is again similar to FIG. 4, but shows yet another example of how the FIG. 4 circuitry may be configured by a user to perform yet another FFE function.

FIG. 7 shows yet another illustrative example of how the FIG. 4 circuit construction can be controlled (e.g., configured or programmed) by a user to achieve yet another illustrative TX FFE function. Once again, in FIG. 7 all routing connections that are actually used from delay line 110 to and through muxes 310 are fully drawn in. The FIG. 7 configuration has a main tap (sourced from delay line tap $D_1$) and one pre-cursor tap (sourced from delay line tap $D_0$). The z-domain transfer function of the FIG. 7 configuration is:

$$H(z) = X(z)Y(z)$$
$$= (a_0 + a_1 + a_5)z^{-1} + (a_2 + a_3 + a_4)$$

In FIG. 7 the pre-cursor tap is split among the DACs controlled by $R_0$, $R_1$, and $R_5$; the main tap is split among the DACs controlled by $R_2$, $R_3$, and $R_4$.

FIG. 9 shows an illustrative embodiment of circuitry that can be used to facilitate making the sign of each tap coefficient either positive or negative. As shown in FIG. 9 the signal from representative delay tap $D_m$ is applied to respective selectable inputs of representative multiplexer 310 in both "true" and "complement" form. The true form is labelled $D_m$. The complement form is produced by passing the true form through inverter 910 to produce logically inverted signal $D_m$BAR. The true and complement forms of all of the other delay line tap signals are similarly applied to respective selectable inputs of mux 310. The selection control signals $M_r$ of mux 310 allow that mux to select any of its true or complement inputs D as the signal applied to the DAC 320 associated with that mux. This allows the tap coefficient implemented (at least in part) by that DAC to be either positive (true selection made by mux 310) or negative (complement selection made by mux 310).

Figure 10:
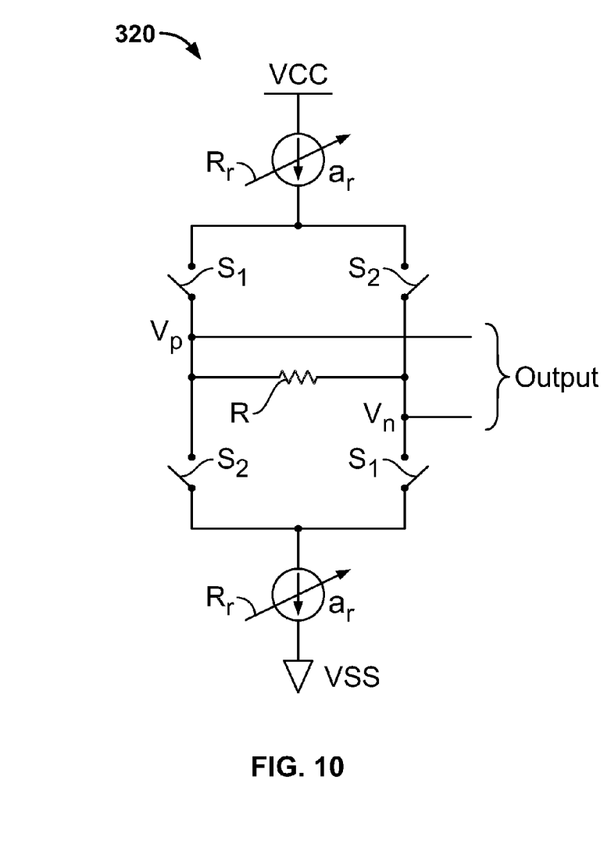
FIG. 10 is a simplified schematic block diagram of an illustrative embodiment of another representative portion of circuitry in accordance with the invention.
Figure 11:
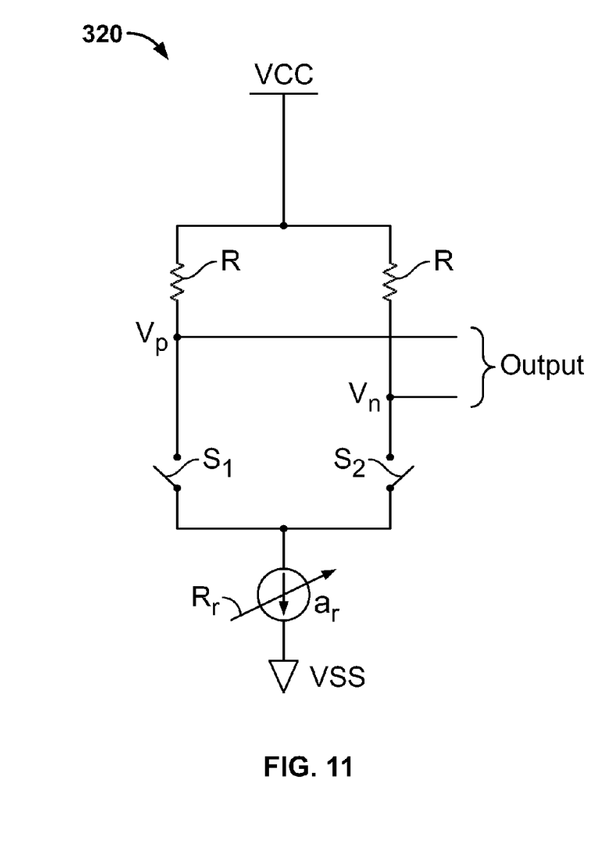
FIG. 11 is similar to FIG. 10 for another illustrative embodiment in accordance with the invention.

Use of delay line tap signals that can have either true or complement form can be facilitated by constructing DACs 320 as differential structures. For example, FIG. 10 shows an example of one representative H-bridge or H-tree DAC structure of this type, and FIG. 11 shows an example of one representative current mode logic ("CML") DAC structure of this type. In each of FIGS. 10 and 11 switches $S_1$ can be closed when $D_m$ is logic 1 and open when $D_m$ is logic 0. Conversely, switches $S_2$ can be closed when $D_m$ is logic 0 and open when $D_m$ is logic 1. It will be apparent from these FIGS. how the effect of the $D_m$ signal on the output of the representative DAC 320 can be reversed or inverted by logically inverting the $D_m$ signal (i.e., to $D_m$BAR).

(In FIG. 10 VCC is power supply voltage, and VSS is typically ground potential or voltage. The element immediately below VCC is a current source of controllably variable strength, current strength control being provided by previously described control signals $R_r$. The element immediately above VSS is a current sink of controllably variable strength, again controlled by signals $R_r$. Element R is a resistor connected between output nodes $V_p$ and $V_n$. In FIG. 11 VCC and VSS can be logically the same as in FIG. 10. Elements R are resistors. The element immediately above VSS is a current sink logically similar to the current sink in FIG. 10 and having similar control by signals $R_r$.)

Although the illustrative embodiments shown (for example) in FIGS. 4-7 depict a bank of multiplexers 310 for routing each delay line tap signal D to any of DACs 320, it will be understood that this is only an example of how this controllable routing structure can be constructed. In general, any type of non-blocking cross-point switch circuitry can be used for selectably routing signals from delay line outputs D to the inputs to DACs 320. Whatever routing circuitry is used for this purpose, it preferably has the ability to route each delay line tap signal D to any DAC 320. Moreover, in order to support the possibility of split taps, it is further preferable that the routing circuitry employed also have the ability to route each delay line tap signal D to more than one DAC 320 (most preferably all of the DACs).

To briefly recapitulate and in some respects extend the foregoing, the present invention has several important advantages. One of these is greater flexibility with regard to FFE taps. This includes having a controllable (e.g., programmable) number of number of taps, controllable (e.g., programmable) tap positions (e.g., pre-cursor and/or post-cursor taps), and controllable (e.g., programmable) tap coefficients. These attributes of the invention facilitate supporting a wider range of channels 10. The invention also helps to optimize the current DACs 320 that are provided for tap coefficients. By facilitating better use of the DACs 320 that are provided, it is not necessary to provide dedicated current legs that may not be used in many applications of the device. The DAC resources of the device do not need as much extra current capacity because flexible routing 310 allows much more efficient use of the DAC current capacity that is provided. This allows down-sizing of the switches that are employed in DACs 320. Area and power are saved, and there is an improvement in TX return loss.

Figure 8:
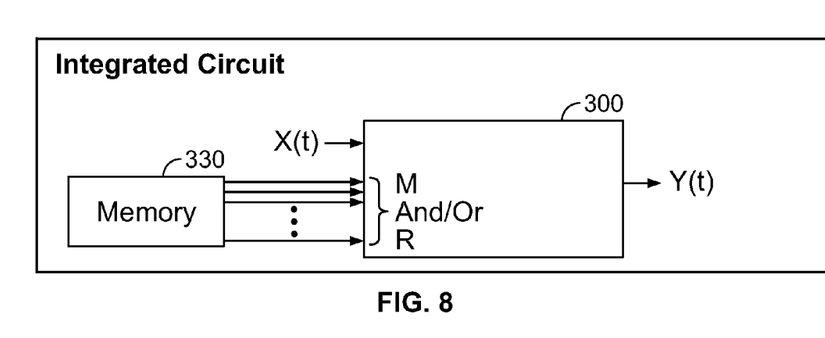
FIG. 8 is a simplified schematic block diagram of an illustrative embodiment of circuitry that can be used to control various aspects of the operation of FFE circuitry in accordance with the invention.

For completeness, FIG. 8 shows that TX equalizer circuitry 300 (e.g., as in FIG. 4) may be part of the circuitry of an integrated circuit ("IC") device 340. The input serial data signal X(t) may come from other circuitry of IC 340. The equalized output signal Y(t) of equalizer circuitry 300 may go to still other circuitry of IC 340. For example, this last-mentioned other circuitry may be output driver circuitry for driving Y(t) out of IC 340 and into a transmission channel 10 as shown in FIG. 1. FIG. 8 also shows that memory circuitry 330 that is part of IC 340 may be used to supply to equalizer circuitry 300 the control signals M and/or R that control various aspects of the operation of circuitry 300 as described elsewhere in this specification. For example, among other possibilities that are discussed elsewhere herein, memory 330 may be programmable by a user of IC 340.

It will be understood that the foregoing is only illustrative of the principles of the invention, and that various modifications can be made by those skilled in the art without departing from the scope and spirit of the invention. For example, the particular numbers of delay line taps D, muxes 310, and DACs 320 shown in FIG. 4 are only illustrative, and larger or smaller numbers of these various elements can be used instead if desired. As another example of modifications within the scope of the invention, the routing circuitry 310 shown in FIG. 4 has universal connectivity (meaning that any delay line tap signal D can be connected to any DAC 320 in FIG. 4). Such complete connectivity may not be required in all embodiments of the invention. For example, it may be sufficient for the routing circuitry to make it possible to connect some (or even each) of the delay line tap signals D to only some of the DACs. However, it will still typically be possible to connect (via the routing circuitry) each of the delay line tap signals to at least a subplurality of the DACs, and (similarly) each DAC will typically be connectable (via the routing circuitry) to at least a subplurality of the delay line tap signals.

It will be apparent from the foregoing that terms like selectable, controllable, programmable, and the like generally mean user-selectable, user-controllable, user-programmable, or the like, where the "user" is someone or some entity making use of a device like IC 340 after the device has been manufactured by the manufacturer.

What is claimed is:

1. Transmitter equalizer circuitry for operating on an input signal to produce an equalized signal comprising:
   delay circuitry for producing a plurality of differently delayed versions of the input signal;
   a plurality of electrical current digital-to-analog converter ("DAC") circuits; and
   routing circuitry for selectably routing each of the delayed versions of the input signal to any of the plurality of the DAC circuits coupled to the routing circuitry, wherein the routing circuitry comprises a plurality of multiplexer circuits, wherein input terminals for each of the multiplexer circuits receive the plurality of differently delayed versions of the input signal.

2. The transmitter equalizer circuitry defined in claim 1 further comprising:
   summation circuitry for combining output signals of the DAC circuits to produce the equalized signal.

3. The transmitter equalizer circuitry defined in claim 1 wherein each of the DAC circuits operates with selectable current strength.

4. The transmitter equalizer circuitry defined in claim 1 wherein the routing circuitry is programmable to select which of the DAC circuits each of the delayed versions of the input signal is routed to.

5. The transmitter equalizer circuitry defined in claim 3 wherein each of the DAC circuits is programmable to select the current strength with which that DAC circuit operates.

6. The transmitter equalizer circuitry defined in claim 1 wherein the routing circuitry can connect each of the delayed versions of the input signal to any of the DAC circuits.

7. The transmitter equalizer circuitry defined in claim 1 wherein the routing circuitry comprises a plurality of multiplexer circuits, each having a plurality of selectable input terminals and an output terminal, and each being capable of connecting any one of its input terminals to its output terminal, wherein for each of the multiplexer circuits each of the input terminals receives a respective one of the delayed versions of the input signal, and wherein the output terminal of each of the multiplexer circuits is connected to a respective one of the DAC circuits.

8. The transmitter equalizer circuitry defined in claim 7 wherein each of the multiplexer circuits has one input terminal for each of the delayed versions of the input signal.

9. The transmitter equalizer circuitry defined in claim 8 wherein each of the multiplexer circuits has selection control input terminals for receiving control signals that determine which of the selectable input terminals of that multiplexer circuit the multiplexer circuit connects to its output terminal.

10. The transmitter equalizer circuitry defined in claim 9 further comprising memory circuitry for storing signals for application to the selection control input terminals.

11. The transmitter equalizer circuitry defined in claim 10 wherein the memory circuitry is programmable by a user of the equalizer circuitry.

12. The transmitter equalizer circuitry defined in claim 1 wherein the input signal is a digital data signal that represents bits of data one after another in succession, the time duration of each bit in the digital data signal being one unit interval.

13. The transmitter equalizer circuitry defined in claim 12 wherein the delayed versions of the input signal have one unit interval of delay between each delayed version and a next more delayed one of the delayed versions.

14. The transmitter equalizer circuitry defined in claim 1 further comprising:
   circuitry for selectably routing a logically inverted form of at least one of the delayed versions of the input signal to at least one of the DAC circuits.

15. Transmitter equalizer circuitry for operating on a serial, digital, data input signal to produce an equalized, serial, digital, data output signal comprising:
   a plurality of delay circuit elements connected in a series for successively delaying the serial, digital, data input signal, each of the delay circuit elements delaying the serial, digital, data input signal by a time duration of one bit in the serial, digital, data input signal;
   a plurality of electrical current digital-to-analog converter ("DAC") circuits; and
   routing circuitry that is controllable for selectably applying a delayed version of the serial, digital, data input signal that is output by each of the delay circuit elements to any of the plurality of the DAC circuits coupled to the routing circuitry, wherein the routing circuitry comprises a plurality of multiplexer circuits, wherein input terminals for each of the multiplexer circuits receive the delayed version of the serial, digital, data input signal that is output by the plurality of delay circuit elements.

16. The transmitter equalizer circuitry defined in claim 15 further comprising:
   summation circuitry for combining outputs of the DAC circuits to produce the output signal.

17. The transmitter equalizer circuitry defined in claim 15 wherein each of the DAC circuits is controllable by a user of the equalizer circuitry with respect to current strength used by that DAC circuit.

18. The transmitter equalizer circuitry defined in claim 15 further comprising memory circuitry programmable by a user of the equalizer circuitry for controlling routing of signals through the routing circuitry.

19. The transmitter equalizer circuitry defined in claim 15 wherein the routing circuitry is controllable by a user of the equalizer circuitry.

20. Transmitter equalizer circuitry for operating on a serial, digital, data input signal to produce an equalized output signal comprising:
   a plurality of delay circuit elements connected in a series for successively delaying the serial, digital, data input signal, each of the delay circuit elements delaying the serial, digital, data input signal by a duration in time of one bit in the serial, digital, data input signal;

a plurality of electrical current digital-to-analog converter ("DAC") circuits; and routing circuitry comprising a plurality of multiplexer circuits, each of which has a plurality of selectable input terminals, wherein for each of the multiplexer circuits each input terminal of that multiplexer circuit receives a delayed version of the input serial, digital, data signal that is output by a respective one of the delay circuit elements, wherein the routing circuitry is controllable for selectably applying a delayed version of the input serial, digital, data input signal that is output by each of the delay circuit elements to any of the plurality of the DAC circuits connected to the routing circuitry.

21. The transmitter equalizer circuitry defined in claim 20 further comprising:

summation circuitry for combining outputs of the DAC circuits to produce the equalized output signal.

22. The transmitter equalizer circuitry defined in claim 21 wherein each of the DAC circuits is controllable with respect to current strength used by that DAC circuit.

23. The transmitter equalizer circuitry defined in claim 1 wherein for each of the multiplexer circuits each of the input terminals receives a respective one of the delayed versions of the input signal.

* * * * *